(12) United States Patent
Kim et al.

(10) Patent No.: US 9,824,417 B2
(45) Date of Patent: Nov. 21, 2017

(54) IMAGE SIGNAL PROCESSOR FOR GENERATING DEPTH MAP FROM PHASE DETECTION PIXELS AND DEVICE HAVING THE SAME

(71) Applicant: Samsung Electronics Co., Ltd., Suwon-si, Gyeonggi-do (KR)

(72) Inventors: Dong Hoon Kim, Seongnam-si (KR); Ju Hyun Cho, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/063,109

(22) Filed: Mar. 7, 2016

(65) Prior Publication Data

US 2016/0267666 A1     Sep. 15, 2016

(30) Foreign Application Priority Data

Mar. 9, 2015 (KR) ........................ 10-2015-0032452

(51) Int. Cl.
*G06K 9/00* (2006.01)
*G06T 1/20* (2006.01)
*G06F 3/01* (2006.01)
*H04N 13/02* (2006.01)
*G06T 7/557* (2017.01)

(52) U.S. Cl.
CPC ............... *G06T 1/20* (2013.01); *G06F 3/017* (2013.01); *G06T 7/557* (2017.01); *H04N 13/0203* (2013.01); *G06T 2200/21* (2013.01); *G06T 2207/10024* (2013.01)

(58) Field of Classification Search
None
See application file for complete search history.

(56) References Cited

U.S. PATENT DOCUMENTS

| 7,333,652 | B2 * | 2/2008 | Berestov | ................. G06T 7/593 382/106 |
| 7,711,201 | B2 * | 5/2010 | Wong | ....................... G03B 3/02 382/254 |
| 8,134,637 | B2 | 3/2012 | Rossbach et al. | |
| 8,654,195 | B2 * | 2/2014 | Ishiyama | ........... H04N 5/23212 348/135 |
| 8,885,071 | B2 | 11/2014 | Ohwa et al. | |
| 8,902,321 | B2 | 12/2014 | Venkataraman et al. | |

(Continued)

FOREIGN PATENT DOCUMENTS

| JP | 2012150289 | | 8/2012 |
| JP | 2012150289 A | * | 8/2012 |

*Primary Examiner* — Feng Niu
(74) *Attorney, Agent, or Firm* — Volentine & Whitt, PLLC

(57) ABSTRACT

An image signal processor including a CPU is provided. The CPU receives image data and positional information of phase detection pixels from an imaging device, extracts first phase detection pixel data and second phase detection pixel data from the image data using the positional information of phase detection pixels, computes first phase graphs from the first phase detection pixel data based upon moving a first window, computes second phase graphs from the second phase detection pixel data based upon moving a second window, computes disparities of the phase detection pixels using the first phase graphs and the second phase graphs, and generates a depth map using the disparities.

20 Claims, 17 Drawing Sheets

(56) References Cited

U.S. PATENT DOCUMENTS

| | | | | |
|---|---|---|---|---|
| 8,913,037 B1* | 12/2014 | Liu | G06F 3/0425 | 345/175 |
| 8,982,190 B2* | 3/2015 | Kobayashi | G02B 27/26 | 348/49 |
| 9,053,562 B1* | 6/2015 | Rabin | G06T 19/00 | |
| 9,118,904 B2* | 8/2015 | Kobayashi | G02B 27/26 | |
| 9,172,944 B2* | 10/2015 | Tajiri | H04N 13/0022 | |
| 9,207,779 B2* | 12/2015 | Kong | G06F 3/011 | |
| 9,420,261 B2* | 8/2016 | Ueda | G02B 7/34 | |
| 9,571,818 B2* | 2/2017 | Pulli | H04N 13/0253 | |
| 2006/0029270 A1* | 2/2006 | Berestov | G06T 7/593 | 382/154 |
| 2010/0158387 A1* | 6/2010 | Choi | G06K 9/4642 | 382/195 |
| 2012/0249846 A1 | 10/2012 | Nishio et al. | | |
| 2013/0033575 A1* | 2/2013 | Kobayashi | G02B 27/26 | 348/46 |
| 2013/0063569 A1 | 3/2013 | Sato et al. | | |
| 2013/0088621 A1 | 4/2013 | Hamada | | |
| 2013/0120644 A1 | 5/2013 | Fujii | | |
| 2013/0308011 A1 | 11/2013 | Horikawa et al. | | |
| 2014/0078048 A1* | 3/2014 | Kong | G06F 3/011 | 345/156 |
| 2014/0086477 A1* | 3/2014 | You | B60W 40/06 | 382/154 |
| 2014/0333732 A1 | 11/2014 | Hamashima et al. | | |
| 2014/0347537 A1 | 11/2014 | Hamada | | |
| 2014/0368613 A1* | 12/2014 | Krupka | H04N 13/0022 | 348/46 |
| 2015/0030256 A1* | 1/2015 | Brady | H01Q 3/24 | 382/254 |
| 2015/0043826 A1* | 2/2015 | Ishimitsu | G06T 7/004 | 382/190 |
| 2015/0124062 A1* | 5/2015 | Didyk | H04N 13/0011 | 348/51 |
| 2015/0156476 A1* | 6/2015 | Kobayashi | G02B 27/26 | 348/49 |
| 2015/0301351 A1* | 10/2015 | Kobayashi | G02B 27/26 | 348/49 |
| 2016/0005213 A1* | 1/2016 | Lecocq | G06T 15/60 | 345/419 |
| 2016/0182896 A1* | 6/2016 | Seo | G06T 7/80 | 348/46 |

\* cited by examiner (a)

(b)

IMAGE SIGNAL PROCESSOR FOR GENERATING DEPTH MAP FROM PHASE DETECTION PIXELS AND DEVICE HAVING THE SAME

CROSS-REFERENCE TO RELATED APPLICATION

This application claims priority under 35 U.S.C. §119(a) from Korean Patent Application No. 10-2015-0032452 filed on Mar. 9, 2015, the disclosure of which is hereby incorporated by reference in its entirety.

FIELD

Embodiments of the present inventive concept relate to a depth map generating device, and more particularly to an image signal processor for generating a depth map from phase detection pixels and devices having the same.

BACKGROUND

The phase auto focus (PAF) may be a phase detection auto focus or a phase difference auto focus. In three-dimensional computer graphics, a depth map may be an image including information on a distance from a viewpoint to surfaces of scene objects.

To generate the depth map, two cameras or phase difference detection pixels may be used in the related art. The phase difference detection pixel in the related art may ensure the right or left images or the upper or lower images by shielding a portion of a photodiode with a metal or the like.

SUMMARY

An exemplary embodiment of the present inventive concept is directed to an image signal processor including a CPU which is configured to receive image data and positional information of phase detection pixels from an imaging device, extract first phase detection pixel data and second phase detection pixel data from the image data using the positional information of the phase detection pixels, compute first phase graphs from the first phase detection pixel data based upon moving a first window, compute second phase graphs from the second phase detection pixel data based upon moving a second window, compute disparities of the phase detection pixels using the first phase graphs and the second phase graphs, and generate a depth map using the disparities. The CPU is configured to convert the disparities into gray levels, and generate the depth map using the gray levels.

The CPU is configured to set the first window and the second window having the same size as each other, and generate each of the first phase graphs and each of the second phase graphs as moving the first window and the second window in a scanning direction at the same time. Each size of the first phase detection pixel data and the second phase detection pixel data is greater than a size of the depth map.

The CPU is configured to generate three-dimensional image data using color data included in the image data and the depth map. The CPU is configured to recognize a gesture of a user corresponding to the image data using the depth map.

An exemplary embodiment of the present inventive concept is directed to a mobile computing device, including an imaging device including color pixels and phase detection pixels, an application processor including an image signal processor including a first CPU, and the application processor including a second CPU.

At least one of the first CPU and the second CPU is configured to receive image data and positional information of the phase detection pixels from the imaging device, extract first phase detection pixel data and second phase detection pixel data from the image data using the positional information of the phase detection pixels, compute first phase graphs from the first phase detection pixel data based upon moving a first window, compute second phase graphs from the second phase detection pixel data based upon moving a second window, compute disparities of the phase detection pixels using the first phase graphs and the second phase graphs, and generate a depth map using the disparities. The mobile computing device further includes a memory configured to store the image data and the positional information of the phase detection pixels.

The one of the first CPU and the second CPU is configured to convert the disparities into gray levels, and generate the depth map using the gray levels.

The application processor further includes a graphic processing unit (GPU), the one of the first CPU and the second CPU is configured to generate three-dimensional image data using color data included in the image data and the depth map, and the GPU is configured to render the three-dimensional image data.

The one of the first CPU and the second CPU is configured to determine a gesture of a user corresponding to the image data using the depth map. The one of the first CPU and the second CPU is configured to generate a control signal for auto-focus on a region of interest (ROI) using the depth map, and transmit the control signal to the imaging device.

The one of the first CPU and the second CPU is configured to set the first window and the second window which have the same size as each other, and generate each of the first phase graphs and each of the second phase graphs as moving the first window and the second window in a scanning direction at the same time.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
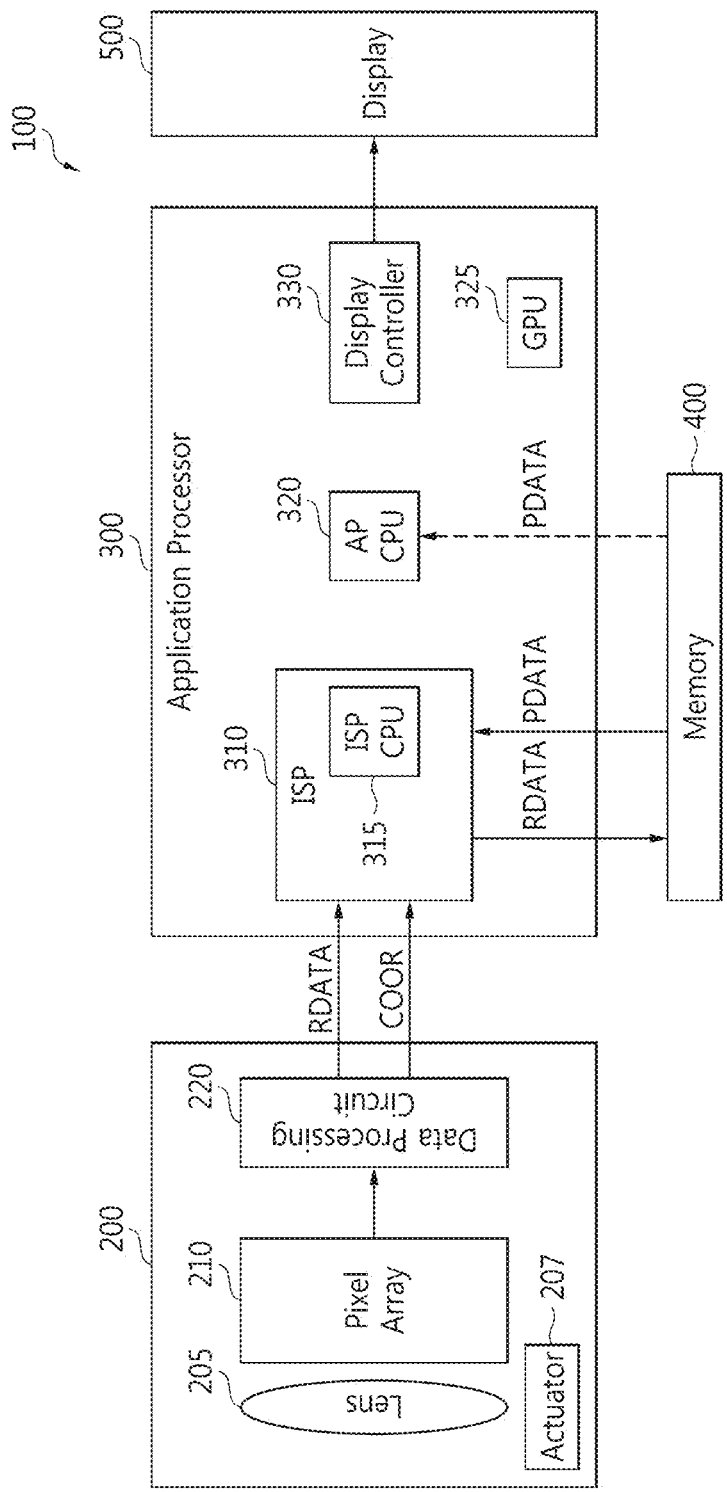
FIG. 1 is a block diagram of a data processing system according to an exemplary embodiment of the present inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram of a data processing system according to some exemplary embodiments of the present inventive concept. Referring to FIG. 1, a data processing system 100 may include an imaging device 200, a controller 300, a memory 400, and a display 500. The data processing system 100 may generate two-dimensional image data or three-dimensional image data. Moreover, the data processing system 100 may determine or recognize a gesture or a pose of a user using a depth map.

The data processing system 100 may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a gesture recognizing device, or a drone.

The imaging device 200 may generate color image data and phase detection pixel data at the same time or in a parallel manner. For example, the imaging device 200 may generate stereoscopic data.

The imaging device 200 may include a lens 205, an actuator 207, a pixel array 210, and a data processing circuit 220. The lens 205 may perform a function of collecting incident light onto the pixel array 210. The imaging device 200 may include an actuator 207 for controlling a movement of the lens 205. For example, the actuator 207 may be an auto-focus motor. A first central processing unit (CPU) 315 or a second CPU 320 may generate a control signal which can control the actuator 207. For example, the imaging device 200 may be embodied as an image sensor module which includes an optical system and a mechanical system.

Figure 2:
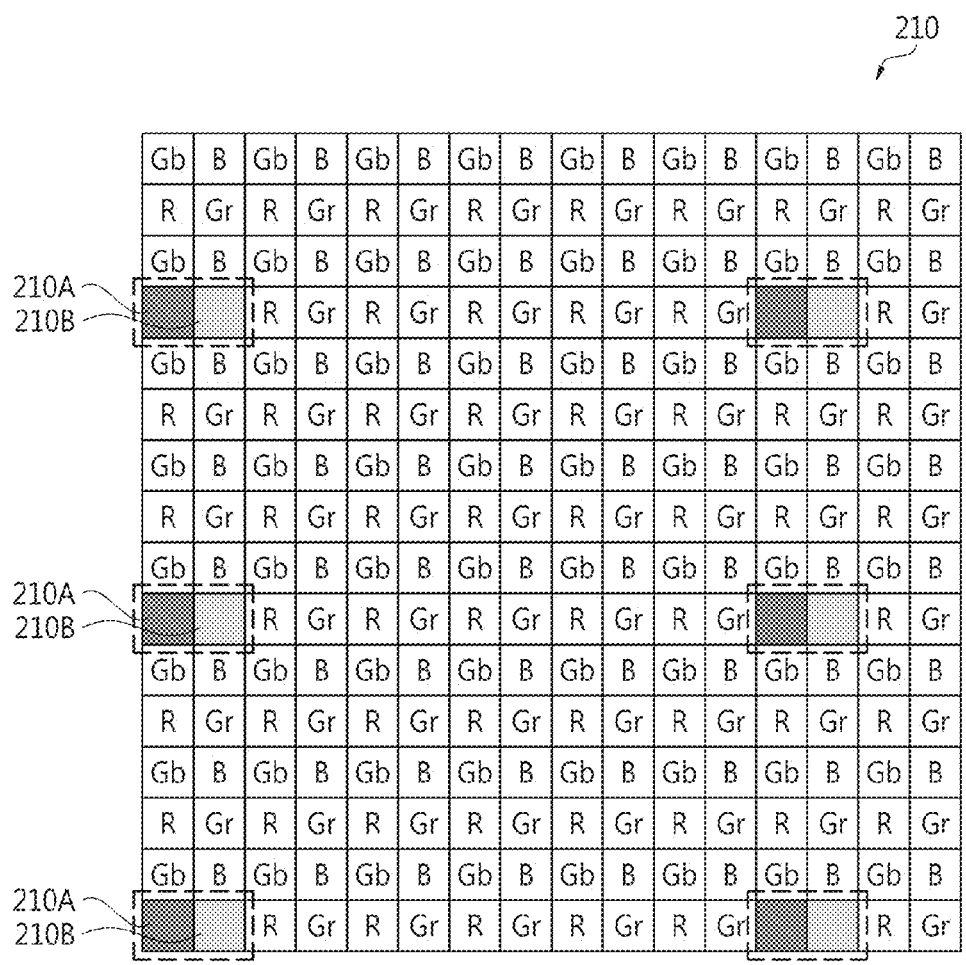
FIG. 2 is a diagram that conceptually shows a disposition of color pixels and phase detection pixels included in the pixel array shown in FIG. 1.

The pixel array 210 to be described referring to FIG. 2 may include color pixels and phase detection pixels. For example, the color pixels and the phase detection pixels may be formed through a complementary metal-oxide-semiconductor (CMOS) process. The color pixels and the phase detection pixels may generate pixel signals in response to an incident light. The data processing circuit 220 may convert analog pixel signals into digital pixel signals. The digital pixel signals may be referred to as image data.

The data processing circuit 220 may transmit image data RDATA including phase detection pixel data to the controller 300 through an interface. The data processing circuit 220 may transmit positional information COOR of phase detection pixels to the controller 300 through an interface. The interface may be embodied as a MIPI® camera serial interface (CSI); however, the interface is not limited thereto. The pixel array 210 and the data processing circuit 220 may be integrated to a CMOS image sensor chip.

The controller 300 may control the memory 400 and the display 500. The controller 300 may be embodied as an integrated circuit (IC), a system on chip (SoC), an application processor (AP), or a mobile AP. The controller 300 may include an image signal processor (ISP) 310, a second CPU 320, a graphics processing unit (GPU) 325, and a display controller 330.

The ISP 310 may receive the image data RDATA and the positional information COOR of phase detection pixels from the imaging device 200. For example, when positions and a pattern of the phase detection pixels are determined in advance, the positional information COOR may include a start position and pattern information. For example, the ISP 310 may receive the positional information COOR of phase detection pixels from the imaging device 200 when performing booting, and store the positional information COOR of phase detection pixels in a memory. The memory may be embodied inside or outside the ISP 310 as a memory accessible by the ISP 310. For example, the memory may be a memory 400.

The memory 400 may collectively define a volatile memory and/or a non-volatile memory. The volatile memory may be embodied as a random access memory (RAM), a dynamic RAM (DRAM), or a static RAM (SRAM). The non-volatile memory may be embodied as a flash memory-based memory, an electrically erasable programmable read-only memory (EEPROM), a magnetic RAM (MRAM), a spin-transfer torque MRAM, a ferroelectric RAM (FeRAM), a phase change RAM (PRAM), or a resistive RAM (RRAM). For example, the flash memory-based memory may be embodied in a multimedia card (MMC), an embedded MMC (eMMC), or a universal flash storage (UFS), for example.

According to an exemplary embodiment, the ISP 310, for example, the first CPU 315, may store image data RDATA in the memory 400, and extract first phase detection pixel data and second phase detection pixel data from the image data RDATA stored in the memory 400 using the positional information COOR of phase detection pixels.

The ISP 310, for example, the first CPU 315, may compute (or calculate) first phase graphs of the first phase detection pixel data based upon moving a first window, compute (or calculate) second phase graphs of the second phase detection pixel data based upon moving a second window, compute disparity of each phase detection pixel using the first phase graphs and the second phase graphs, and generate a depth map using the disparity computed for the each phase detection pixel. According to another exemplary embodiment, the second CPU 320 may extract first phase detection pixel data and second phase detection pixel data from the image data RDATA stored in the memory 400 using the positional information COOR of phase detection pixels acquired in advance.

The second CPU 320 may compute first phase graphs of the first phase detection pixel data based upon moving a first window, compute second phase graphs of the second phase detection pixel data based upon moving a second window, compute a disparity of each phase detection pixel using the first phase graphs and the second phase graphs, and generate a depth map using the disparity of the each phase detection pixel. For example, when the controller 200 is embodied as an AP, the first CPU 315 may be a CPU of the ISP 310, and the second CPU 320 may be a CPU of the AP.

The GPU 325 may render three-dimensional contents or three-dimensional image data generated by the first CPU 315 or the second CPU 320. For example, the first CPU 315 or the second CPU 320 may generate three-dimensional contents or three-dimensional image data using color data included in the image data RDATA and a computed depth map (or depth data).

The first CPU 315 or the second CPU 320 may determine or recognize a gesture or a pose of a user using the depth map. For example, the first CPU 315 or the second CPU 320 may generate a control signal(s) which can control the imaging device 200, the controller 300, the memory 400, and/or the display 500 based on a gesture or a pose of the user which is determined.

The display controller 330 may transmit data related to the image data RDATA, a depth map, and/or three-dimensional contents to the display 500 according to a control of the first CPU 315 or the second CPU 320. The display 500 may display the data related to the image data RDATA, the depth map, and/or the three-dimensional contents. For example, the data related to the image data RDATA may be two-dimensional image data or three-dimensional image data (that is, stereoscopic data) processed by the first CPU 315 or the second CPU 320.

FIG. 2 conceptually shows a disposition of color pixels and phase detection pixels included in the pixel array 210 shown in FIG. 1. Referring to FIG. 2, Gb represents a pixel which can generate green pixel signals in response to wavelengths of a green spectrum, B represents pixels which can generate blue pixel signals in response to wavelengths of a blue spectrum, R represents pixels which can generate red pixel signals in response to wavelengths of a red spectrum, and Gr represents a pixel which can generate green pixel signals in response to wavelengths of a green spectrum.

Each of color pixels Gb, B, R, and Gr may include a photoelectric conversion element which generates photocharges, and a processing circuit which converts the photocharges into a pixel signal. The processing circuit may include four transistors, three transistors, or five transistors; however, it is not limited thereto. The photoelectric conversion element may be embodied as a photodiode, a phototransistor, a photogate, or a pinned photodiode.

Each of the color pixels Gb, B, R, or Gr is exemplarily shown; however, the pixel array 210 may include a yellow pixel, a magenta pixel, and/or a cyan pixel. Even if twelve phase detection pixels 210A and 210B are exemplarily shown in FIG. 2, the number and a position of phase detection pixels included in the pixel array 210 are not limited to those in an exemplary embodiment shown in FIG. 2.

In addition, a pair of phase detection pixels 210A and 210B for auto-focus phase detection are disposed adjacent to each other in a width (or horizontal) direction in FIG. 2, but the pair of phase detection pixels for auto-focus phase detection may be disposed adjacent to each other in a height (or vertical) direction. Phase graphs at this time may be the same as exemplarily shown in FIG. 11.

Figure 3:
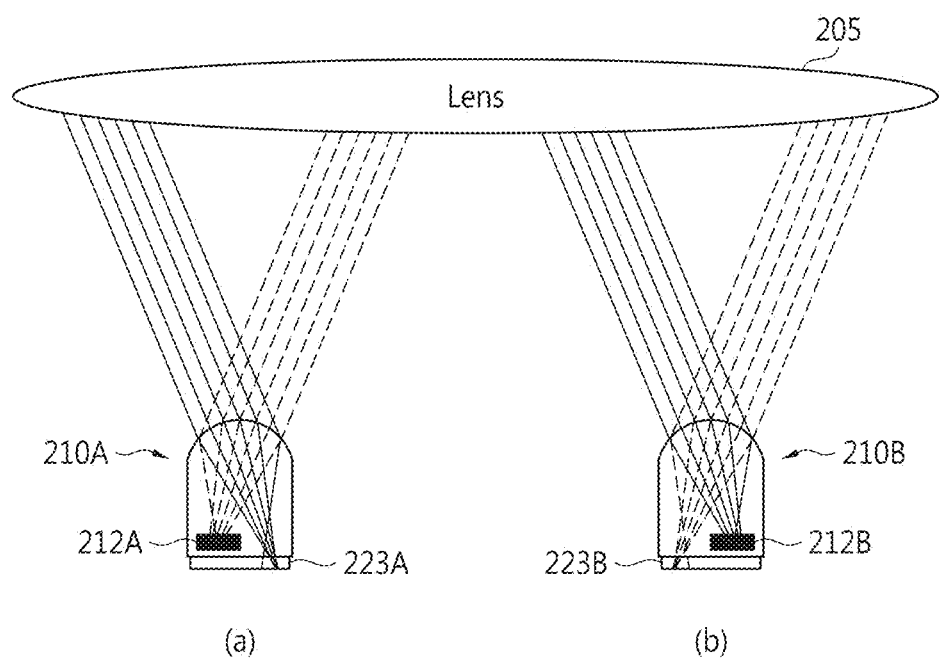
FIG. 3 is a diagram showing a first type phase detection pixel and a second type phase detection pixel shown in FIG. 2.

FIG. 3 shows a first type phase detection pixel and a second type phase detection pixel shown in FIG. 2. Referring to FIGS. 2 and 3, a first type phase detection pixel 210A may include a photoelectric conversion element 223A and a shielding material 212A for shielding a portion of light incident onto the photoelectric conversion element 223A. For example, a left portion of the photoelectric conversion element 223A may be shielded by the shielding material 212A. For example, the shielding material 212A may be a metal.

Referring to FIGS. 2 and 3, a second type phase detection pixel 210B may include a photoelectric conversion element 223B and a shielding material 212B for shielding a portion of light incident onto the photoelectric conversion element 223B. For example, a right portion of the photoelectric conversion element 223B may be shielded by the shielding material 212B. For example, the shielding material 212B may be a metal. Each of the phase detection pixels 210A and 210B may be a pixel which can support phase detection auto-focus.

Figure 4A:
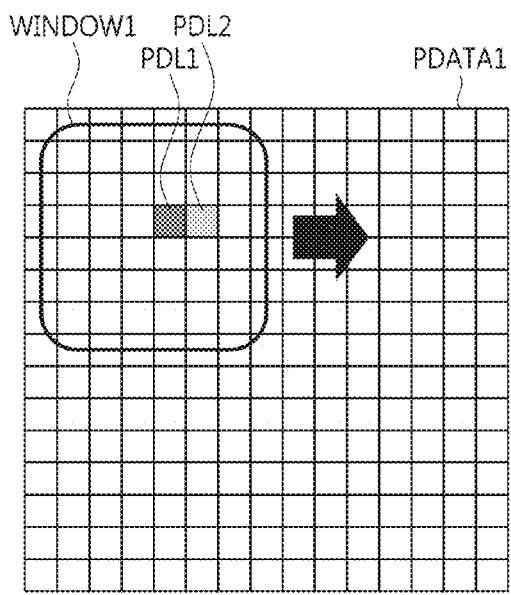
FIGS. 4A and 4B are diagrams showing first phase detection pixel data including a first window present at a first position, and second phase detection pixel data including a second window present at a first position.
Figure 4B:
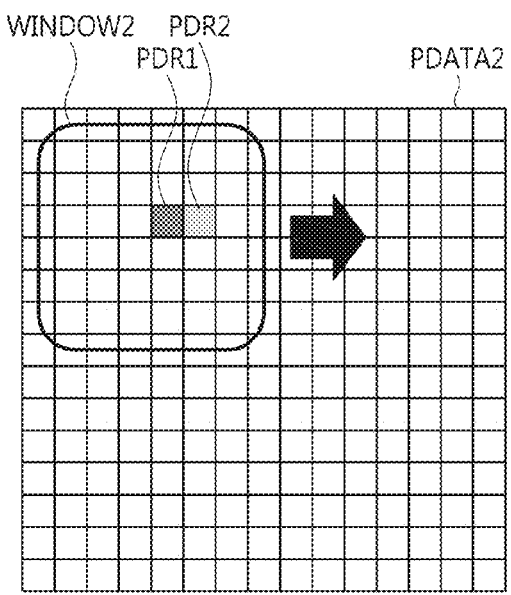

FIGS. 4A and 4B show first phase detection pixel data including a first window present at a first position, and second phase detection pixel data including a second window present at a first position. Referring to FIGS. 1 to 4B, the first CPU 315 or the second CPU 320 may extract phase detection pixel data PDATA from the image data RDATA using the positional information COOR of phase detection pixels. For example, the image data RDATA may be raw Bayer image data.

The first CPU 315 or the second CPU 320 may classify phase detection pixel data PDATA into first phase detection pixel data PDATA1 and second phase detection pixel data PDATA2. For example, the first phase detection pixel data PDATA1 may be phase detection pixel data corresponding to pixel signals output from all the first type phase detection signals 210A included in the pixel array 210, and the second phase detection pixel data PDATA2 may be phase detection pixel data corresponding to pixel signals output from all the second type phase detection pixels 210B included in the pixel array 210.

Referring to FIGS. 4A and 4B, the first CPU 315 or the second CPU 320 may set a size of a first window WINDOW1 so as to scan the first phase detection pixel data PDATA1, and set a size of a second window WINDOW2 so as to scan the second phase detection pixel data PDATA2. The first window WINDOW1 and the size of the second window WINDOW2 may be set to be the same as each other in size, and may move in a scanning direction at the same time.

The size of the first window WINDOW1 is set to be 6*6 pixels and the size of the window WINDOW2 is set to be 6*6 pixels in FIGS. 4A and 4B; however, it is not more than exemplification. Here, a pixel may be a physical pixel, and may be pixel data corresponding to a pixel signal output from the physical pixel.

The first CPU 315 or the second CPU 320 may compute each of phase graphs of the first phase detection pixel data PDATA1 as moving the first window WINDOW1 in a scanning direction, and compute each of phase graphs of the second phase detection pixel data PDATA2 as moving the second window WINDOW2 in the scanning direction. For example, the scanning direction may be a zigzag; however, it is not limited thereto.

For example, one phase graph of the first phase detection pixel data PDATA1 and one phase graph of the second phase detection pixel data PDATA2 may be generated at one time or at one scanning point as shown in FIGS. 5A and 5B, or 8A and 8B.

Figure 5A:
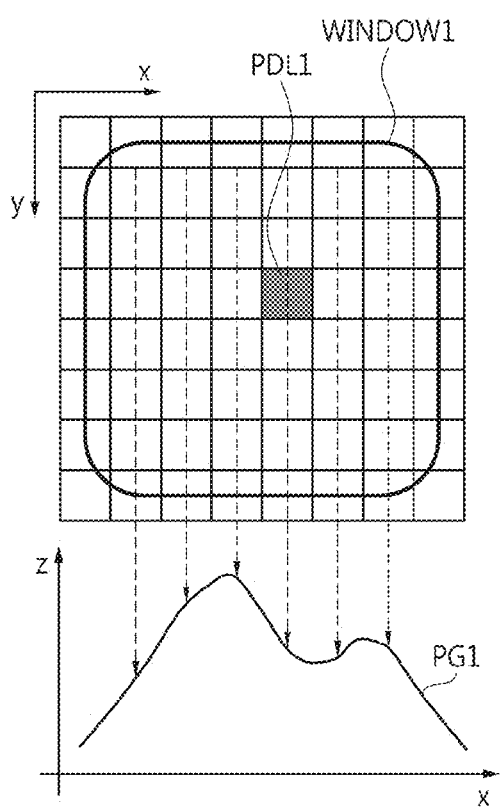
FIGS. 5A and 5B are diagrams showing the first window present at a first position and a first phase graph, and the second widow present at a first position and a second phase graph.
Figure 5B:
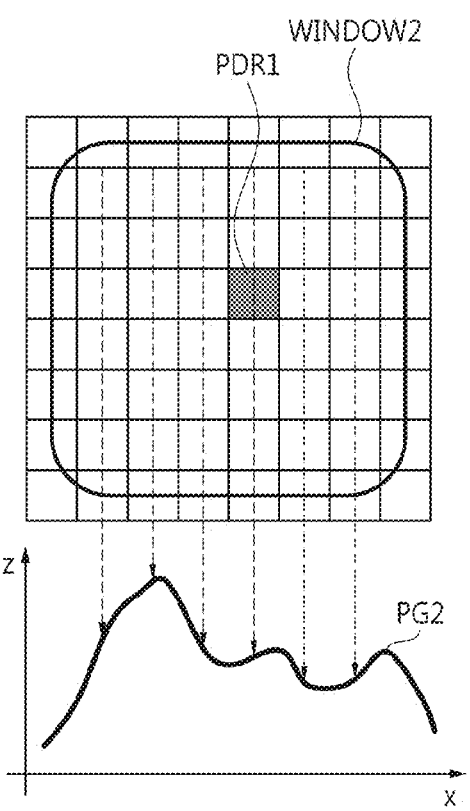

FIGS. 5A and 5B show a first window present at a first position and a first phase graph, and a second widow present at the first position and a second phase graph. Referring to FIGS. 4A and 5A, the first CPU 315 or the second CPU 320 may compute each z value of a first phase graph PG1 for the first window WINDOW1 as a sum of values of each column of the first window WINDOW1 using the first window WINDOW1 present at a first position.

In addition, referring to FIGS. 4B and 5B, the first CPU 315 or the second CPU 320 may compute each z value of a second phase graph PG2 for the second window WINDOW2 as a sum of values of each column of the second widow WINDOW2 using the second window WINDOW2 present at the first position. For example, the first phase graph PG1 may represent a phase detection pixel PDL1, and the second phase graph PG2 may represent a phase detection pixel PDR1.

For example, a z value of each column may be computed by various methods such as Gaussian weighted average or median filtering; however, the methods are not limited thereto. Here, the z value may be depth data.

Figure 6A:
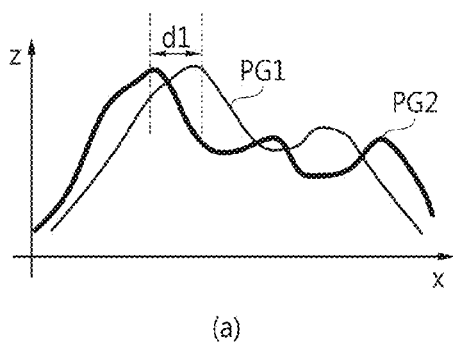
FIGS. 6A and 6B are graphs showing a first disparity and phase graphs after phase compensation.
Figure 6B:
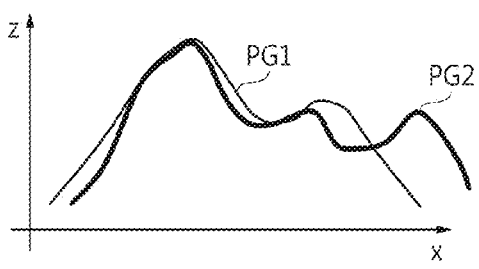

FIGS. 6A and 6B show a first disparity and phase graphs after phase compensation. The first CPU 315 or the second CPU 320 may compute a first disparity d1 using the first phase graph PG1 and the second phase graph PG2.

Referring to FIGS. 6A and 6B, the first CPU 315 or the second CPU 320 moves one of the first phase graph PG1 and the second phase graph PG2 based on the other of the first phase graph PG1 and the second phase graph PG2 so as to reduce or minimize a difference between the first phase graph PG1 and the second phase graph PG2.

For example, if the difference between the first phase graph PG1 and the second phase graph PG2 is minimized when the first phase graph PG1 is moved to the left as much as "d1", "d1" may be defined as a first disparity. For example, a sign of a disparity can be determined according to which of the phase graphs PG1 or PG2 is moved to which direction (for example, left direction or right direction). For example, when a movement of the first phase graph PG1 to the left is defined as a positive disparity, a movement of the first phase graph PG1 to the right may be defined as a negative disparity.

Accordingly, the first CPU 315 or the second CPU 320 may compute "d1" as a first disparity between the phase detection pixels PDL1 and PDR1. Here, it is assumed that the phase detection pixel PDL1 is a first type phase detection pixel, and the phase detection pixel PDR1 is a second type phase detection pixel.

Figure 7A:
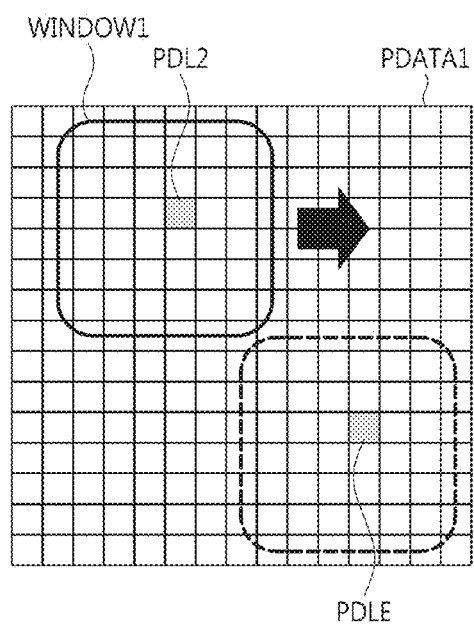
FIGS. 7A and 7B are diagrams showing first phase detection pixel data including a first window present at a second position, and second phase detection pixel data including a second window present at a second position.
Figure 7B:
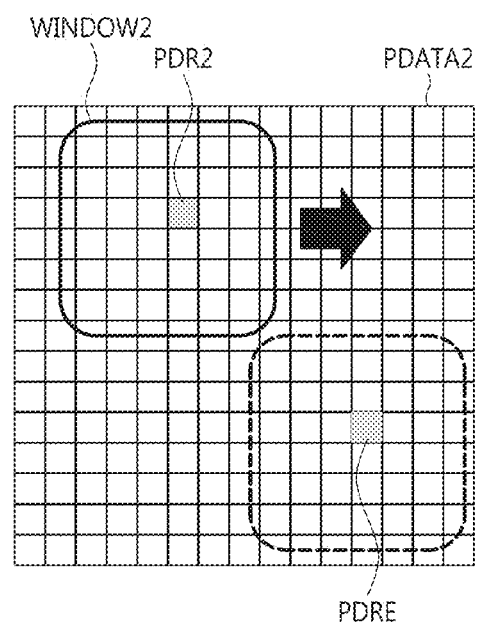
Figure 8A:
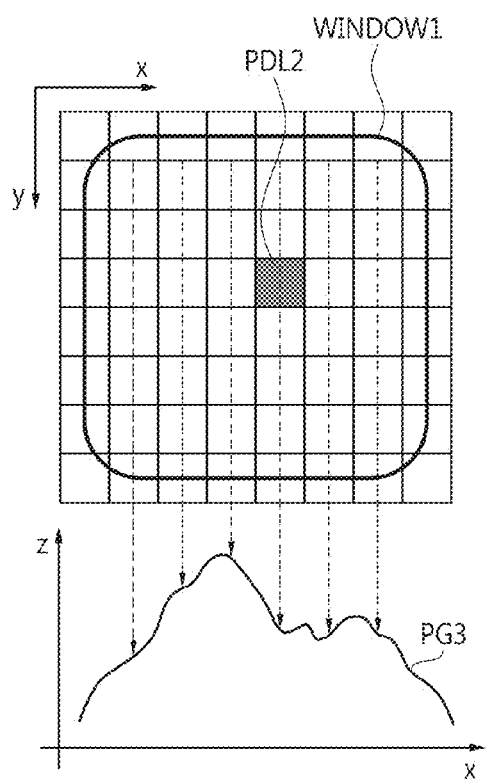
FIGS. 8A and 8B are diagrams showing the first window present at a second position and a third phase graph, and the second window present at a second position and a fourth phase graph.
Figure 8B:
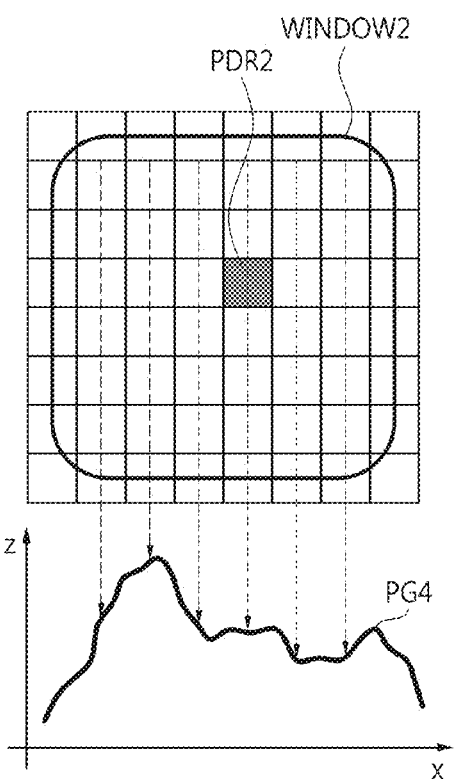
Figure 9A:
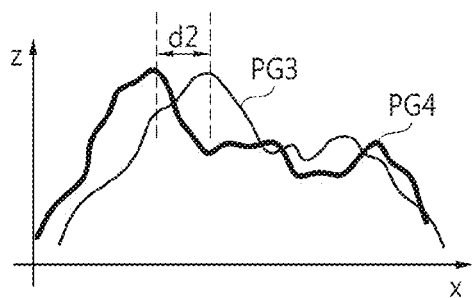
FIGS. 9A and 9B are graphs showing a second disparity, and phase graphs after phase compensation.
Figure 9B:
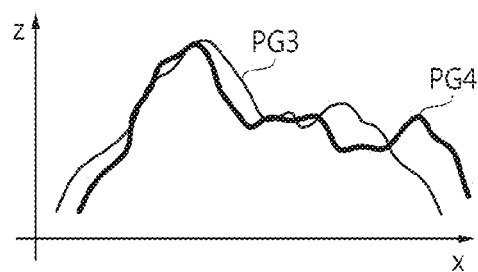

FIGS. 7A and 7B show a first phase detection pixel data PDATA1 including a first window WINDOW1 present at a second position, and a second phase detection pixel data PDATA2 including a second window WINDOW2 present at a second position, and FIGS. 8A and 8B show the first window WINDOW1 present at the second position and a third phase graph PG3, and the second window WINDOW2 present at the second position and a fourth phase graph PG4, and FIGS. 9A and 9B show a second disparity, and phase graphs after phase compensation.

Referring to FIGS. 7A and 8A, the first CPU 315 or the second CPU 320 may compute each z value of a third phase graph PG3 for the window WINDOW1 as a sum of values of each column of the first window WINDOW1 using the first window WINDOW1 present at a second position. Moreover, referring to FIGS. 7B and 8B, the first CPU 315 or the second CPU 320 may compute each z value of a fourth phase graph PG4 for a second window WINDOW2 as a sum of values of each column of the second window WINDOW2 using the second window WINDOW2 present at a second position. The third phase graph PG3 may represent a phase detection pixel PDL2, and the fourth phase graph PG4 may represent a phase detection pixel PDR2.

The first CPU 315 or the second CPU 320 may compute a second disparity d2 using the third phase graph PG3 and the fourth phase graph PG4.

Referring to FIGS. 9A and 9B, the first CPU 315 or the second CPU 320 moves one of the third phase graph PG3 and the fourth phase graph PG4 based on the other of the third phase graph PG3 and the fourth phase graph PG4 so as to reduce or minimize a difference between the third phase graph PG3 and the fourth phase graph PG4. For example, if a difference between the third phase graph PG3 and the fourth phase graph PG4 is minimized when the third phase graph PG3 moves to the left as much as "d2", "d2" may be defined as the second disparity.

As described above, a sign of a disparity can be determined according to which of the phase graphs PG3 and PG4 is moved to which direction (for example, left direction or right direction). For example, when a movement of the third phase graph PG3 to the left is defined as a positive disparity, and a movement of the third phase graph PG3 to the right may be defined as a negative disparity. Accordingly, the first CPU 315 or the second CPU 320 may compute "d2" as a second disparity between the phase detection pixels PDL2 and PDR2. Here, it is assumed that the phase detection pixel PDL2 is a first type phase detection pixel, and the phase detection pixel PDR2 is a second type phase detection pixel.

As described referring to FIGS. 4A to 9B, the first CPU 315 or the second CPU 320 may compute a phase graph of a last phase detection pixel PDLE as moving the first window WINDOW1 for first phase detection data PDATA1 in a scanning direction. Moreover, the first CPU 315 or the second CPU 320 may compute a phase graph of the last phase detection pixel PDRE as moving the second window WINDOW2 for the second phase detection data PDATA2 in the scanning direction.

The first CPU 315 or the second CPU 320 may compute a last disparity using the phase graph of the last phase detection pixel PDLE and the phase graph of the last phase detection pixel PDRE. That is, the first CPU 315 or the second CPU 320 may compute a disparity between the phase detection pixels PDLE and PDRE.

Figure 10:
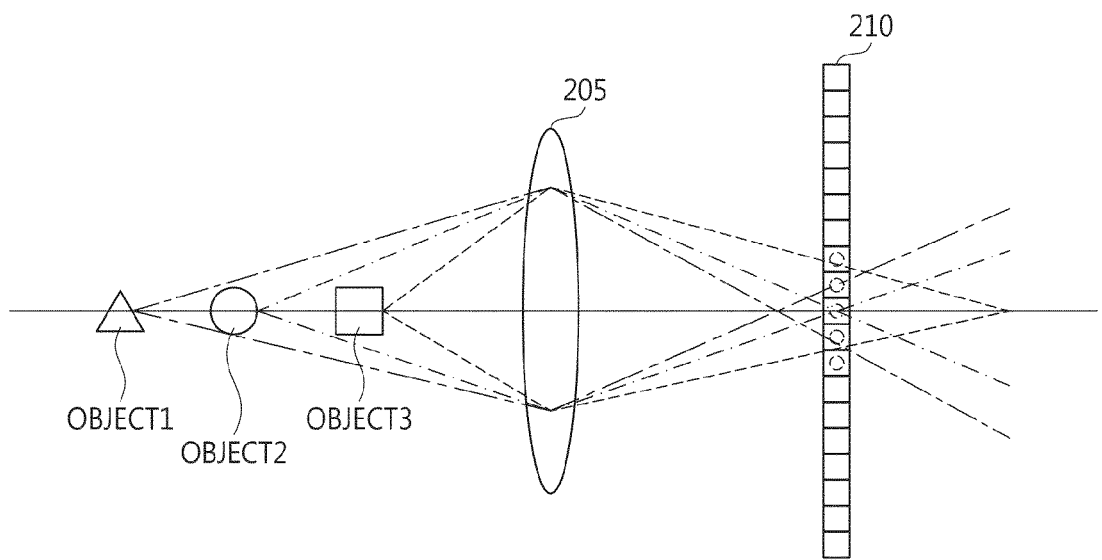
FIG. 10 is a diagram showing a focus principle using one lens.

FIG. 10 shows a focus principle using one lens. Referring to FIG. 10, rays for a second object OBJECT2 intersect at the pixel array 210 or an image plane, such that the second object OBJECT2 is well focused on. However, a first object OBJECT1 or a third object OBJECT3 are not well focused on. In terms of a phase detection auto-focus, the lens 205 needs to be far away from the pixel array 210 or the image plane so as to focus on a third object OBJECT3. Moreover, in terms of a phase detection auto-focus, the lens 205 needs to move to the pixel array 210 or the image plane so as to focus on the first object OBJECT1. At this time, a sign of a disparity of the first object OBJECT1 is different from a sign of a disparity of the third object OBJECT3.

For example, a positive disparity may mean that an object is relatively close to the imaging device 200, and a negative disparity may mean that an object is relatively far away from the imaging device 200. A disparity of the third object OBJECT3 may be larger than a disparity of the first object OBJECT1. That is, a disparity may correspond to a distance between an object (or user or a subject) and the imaging device 200. For example, the first CPU 315 or the second CPU 320 may convert the disparity into a depth value.

Figure 11A:
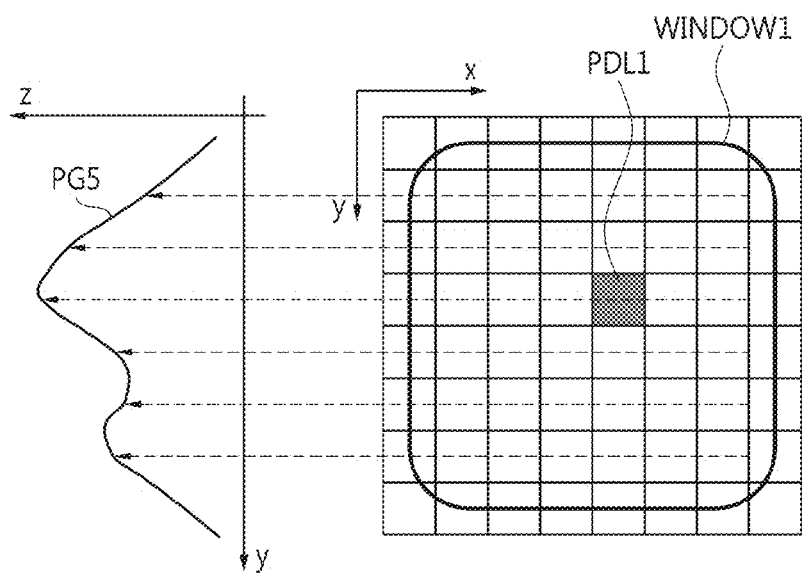
FIGS. 11A and 11B are diagrams showing phase graphs when phase detection pixels are disposed in an up and down relationship.
Figure 11B:
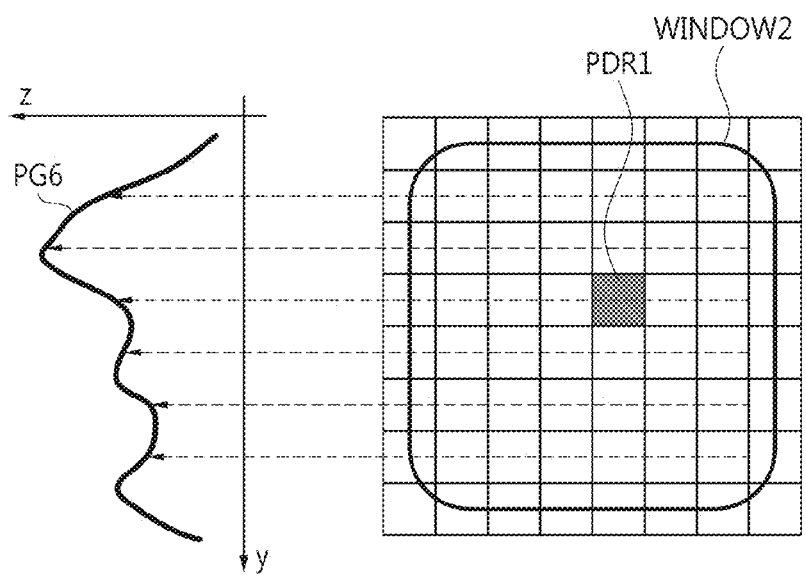

FIGS. 11A and 11B show phase graphs when phase detection pixels are disposed in a vertical or up and down relationship. When a first phase detection pixel PDL1 and a second phase detection pixel PDR1 are disposed adjacent to each other in a column direction, e.g., a y-axis direction, as shown in FIG. 11A, the first CPU 315 or the second CPU 320 may compute each z value of a fifth phase graph PG5 for the first window WINDOW1 as a sum of values of each row of the first window WINDOW1 using the first window WINDOW1 present at a first position. As shown in FIG. 11B, the first CPU 315 or the second CPU 320 may compute each z value of a sixth phase graph PG6 for the second window WINDOW2 as a sum of values of each row of the second window WINDOW2 using the second window WINDOW2 present at a first position. For example, the fifth phase graph PG5 may represent the phase detection pixel PDL1 and the sixth phase graph PG6 may represent the phase detection pixel PDR1.

Figure 12:
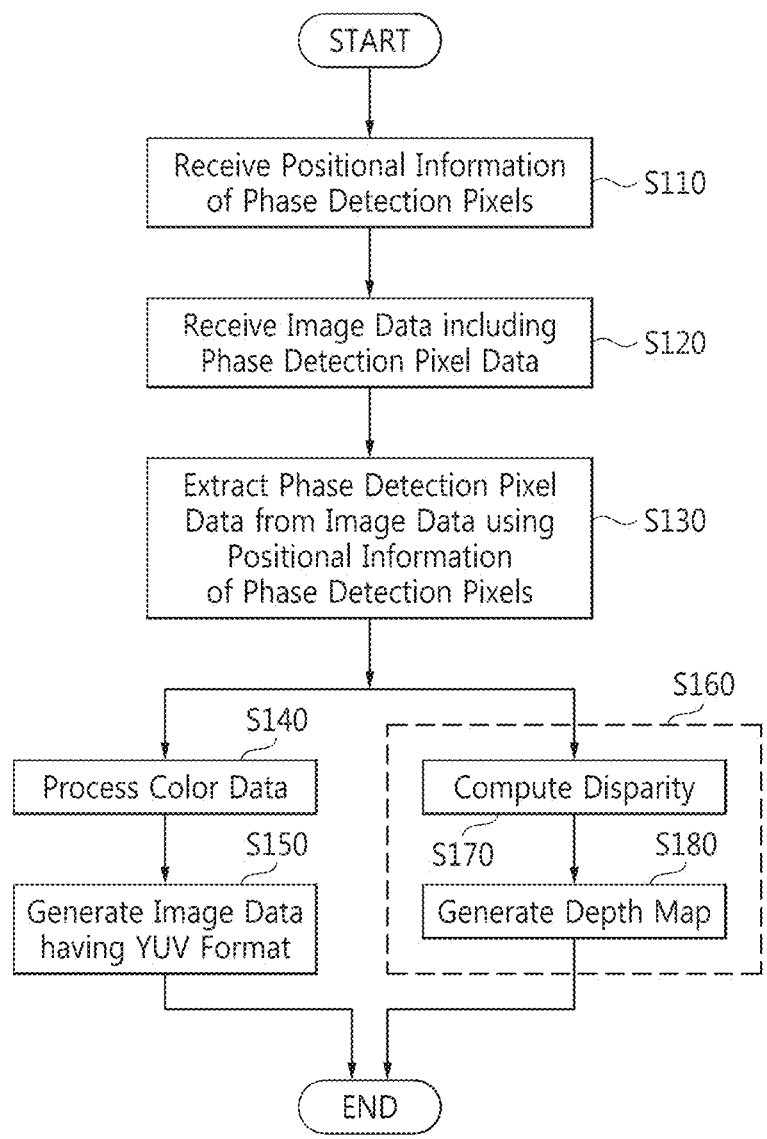
FIG. 12 is a flowchart which shows a method of generating a depth map according to an exemplary embodiment of the present inventive concept.

FIG. 12 is a flowchart which shows a method of generating a depth map according to an exemplary embodiment of the present inventive concept. Referring to FIGS. 1 to 12, the controller 300 may receive the positional information COOR of phase detection pixels from the imaging device 200 (S110). The controller 300 may receive the image data RDATA including phase detection pixel data from the imaging device 200 (S120). The controller 300 may extract phase detection pixel data PDATA from the image data RDATA using the positional information COOR of phase detection pixels (S130).

The controller 300 may perform a process of generating a depth map from the extracted phase detection pixel data PDATA (S160). For example, the controller 300 may compute a disparity of each phase detection pixel using the extracted phase detection pixel data PDATA (S170). The controller 300 may generate a depth map (or depth data) using the disparity computed for reach phase detection pixel (S180).

The controller 300 may process color data included in the image data RDATA at the same time as or in a parallel manner with the process of generating a depth map from the extracted phase detection pixel data PDATA (S140), and generate image data having a YUV format according to a result of the processing (S150).

Figure 13:
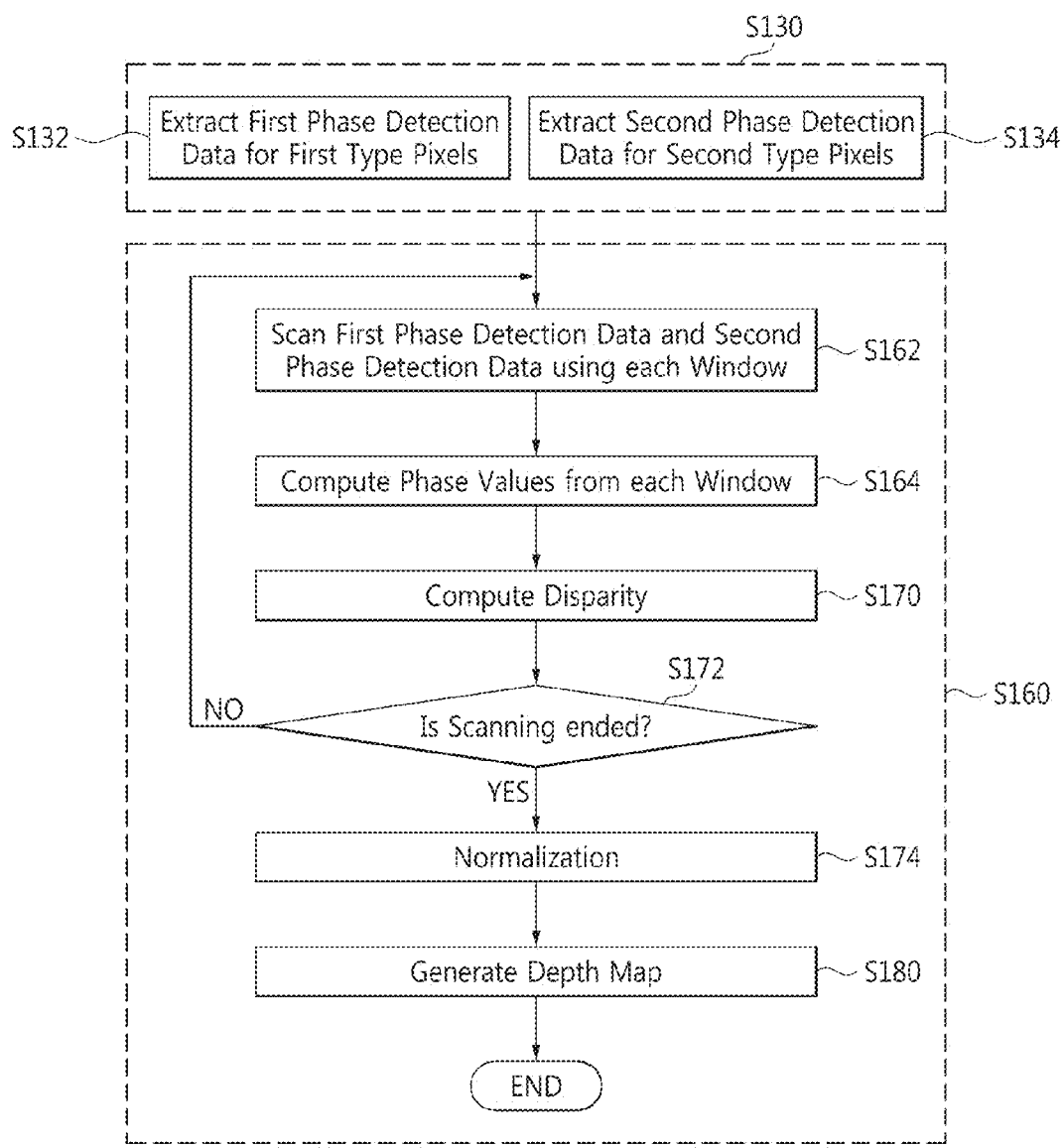
FIG. 13 is a flowchart which shows a method of computing a disparity and a method of generating a depth map in detail according to an exemplary embodiment of the present inventive concepts.

FIG. 13 is a flowchart which shows a method of computing a disparity and a method of generating a depth map in detail according to an exemplary embodiment of the present inventive concepts. Referring to FIGS. 12 and 13, the controller 300 may extract the phase detection pixel data PDATA from the image data RDATA using the positional information COOR of phase detection pixels (S130). That is, the controller 300 may extract the first phase detection data PDATA1 for first type pixels from the image data RDATA (S132) and extract the second phase detection data PDATA2 for second type pixels from the image data RDATA (S134), using the positional information COOR of phase detection pixels. S132 and S134 may be performed at the same time, in a parallel manner, or by an overlap.

The controller 300 may scan the first phase detection pixel data PDATA1 in a scanning direction using the first window WINDOW1, and scan the second phase detection pixel data PDATA2 in the scanning direction using the second window WINDOW2 (S162). That is, the controller 300 may compute first phase graphs for the first phase detection pixel data PDATA1 as moving the first window WINDOW1, and compute second phase graphs for the second phase detection pixel data PDATA2 (S164).

The controller 300 may compute a disparity of each phase detection pixel using the first phase graphs and the second phase graphs (S170). Steps from S162 to S170 may be performed until a scanning is ended (S172). When scanning of the first phase detection pixel data PDATA1 and scanning of the second phase detection pixel data PDATA2 are ended (S172), the controller 300 may normalize a disparity computed for each phase detection pixel (S174). For example, the controller 300 may map disparities onto gray levels so as to visualize a depth.

Figure 14:
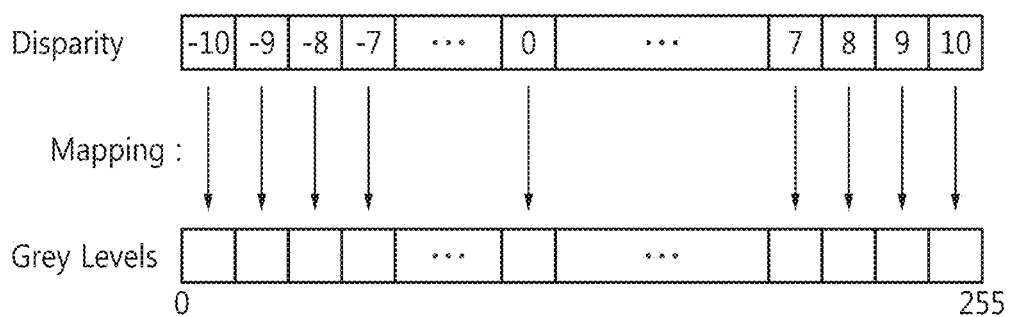
FIG. 14 is a conceptual diagram which shows a method of mapping disparities onto gray levels.

FIG. 14 is a conceptual diagram which shows a method of mapping disparities onto gray levels. For example, when the disparity computed for each phase detection pixel using the first phase graphs and the second phase graphs is in a range from a first value (e.g., −10) to a second value (e.g., +10), the controller 300 may map the disparity computed for each phase detection pixel onto a gray level. For example, when the gray level is expressed by eight bits, the disparity computed for each phase detection pixel may be mapped onto one of a gray level "0" to a gray level "255". For example, the disparity may be expressed by a size of a physical pixel; however, it is not limited thereto. Moreover, a first value of the disparity and a second value of the disparity are not more than exemplification for a description.

The controller 300 may generate a depth map using the disparity computed for each phase detection pixel (S180). For example, the controller 300 generates phase graphs using each of the windows WINDOW1 and WINDOW2, such that a size of the depth map may be smaller than a size of the first phase detection pixel data PDATA1, and the size of the depth map may be smaller than a size of the second phase detection pixel data PDATA2.

As described referring to FIGS. 1 to 14, steps from S130 to S180 may be performed by the CPU 315 of the ISP 310 or the CPU 320 of the AP 300. That is, the CPU 315 of the ISP 310 or the CPU 320 of the AP 300 may perform a computer program which can generate a depth map according to an exemplary embodiment of the present inventive concept.

Figure 15:
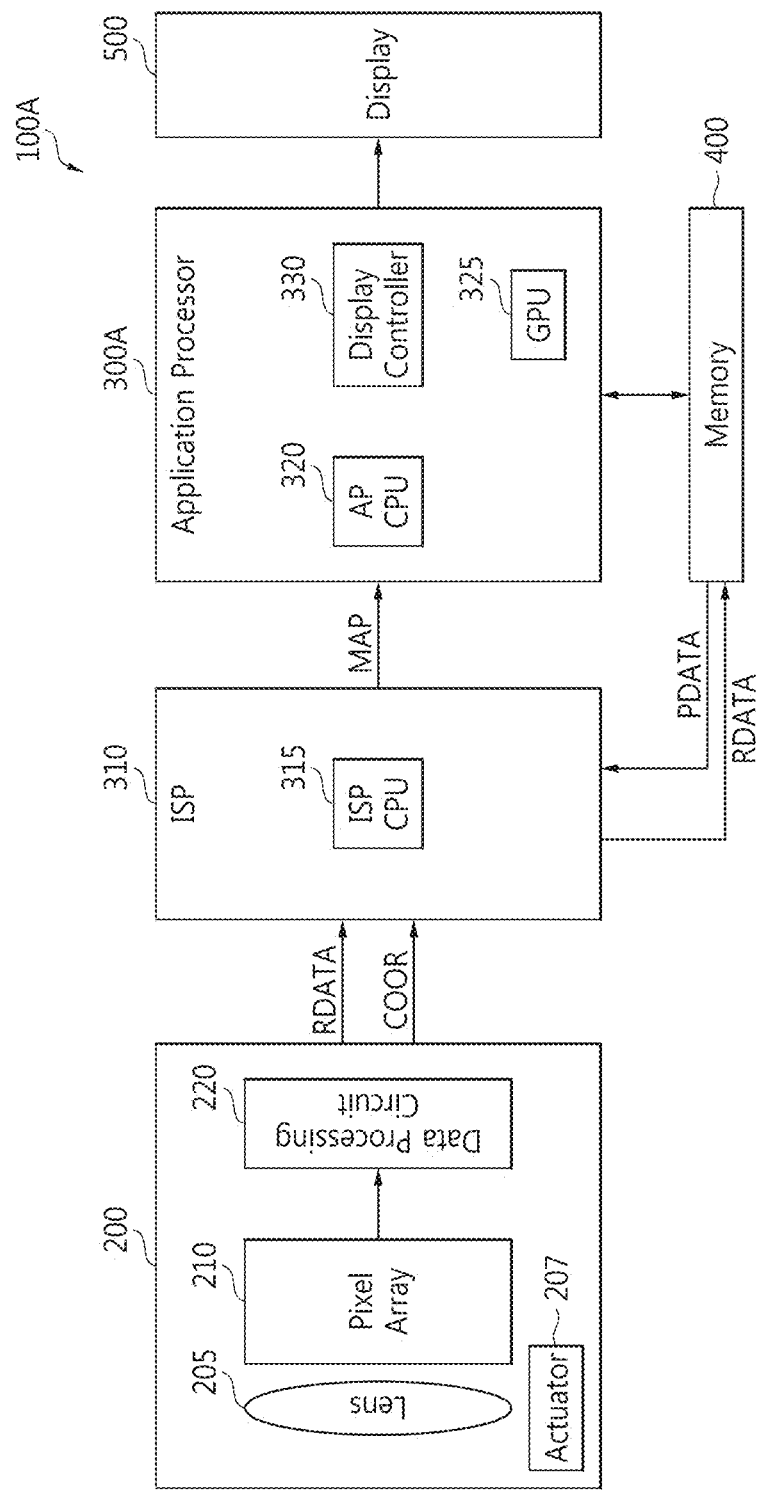
FIG. 15 is a block diagram of a data processing system according to another exemplary embodiment of the present inventive concept.

FIG. 15 is a block diagram of a data processing system according to another exemplary embodiment of the present inventive concepts. Referring to FIG. 15, a data processing system 100A may include the imaging device 200, the ISP 310, an AP 300A, the memory 400, and the display 500. Referring to FIGS. 1 and 15, the ISP 310 may be embodied outside the AP 300A.

The CPU 315 of the ISP 310 may receive the positional information COOR of phase detection pixels 210A and 210B output from the imaging device 200. The CPU 315 of the ISP 310 may store the image data RDATA output from the imaging device 200 in the memory 400, and extract the phase detection pixel data PDATA, e.g., the first phase detection pixel data PDATA1 and the second phase detection pixel data PDATA2, from the image data RDATA stored in the memory 400 using the positional information COOR of phase detection pixels.

The CPU 315 of the ISP 310 may compute first phase graphs for the first phase detection pixel data PDATA1 as moving the first window WINDOW1, and compute second phase graphs for the second phase detection pixel data PDATA2 as moving the second window WINDOW2.

The CPU 315 of the ISP 310 may compute a disparity of each phase detection pixel using the first phase graphs and the second phase graphs, and generate a depth map MAP using the disparity computed for each phase detection pixel. The depth map MAP computed by the CPU 315 of the ISP 310 may be transmitted to the AP 300A. The CPU 320 of the AP 300A may generate three-dimensional contents or three-dimensional image data using color data included in the image data RDATA and the depth map MAP.

Figure 16:
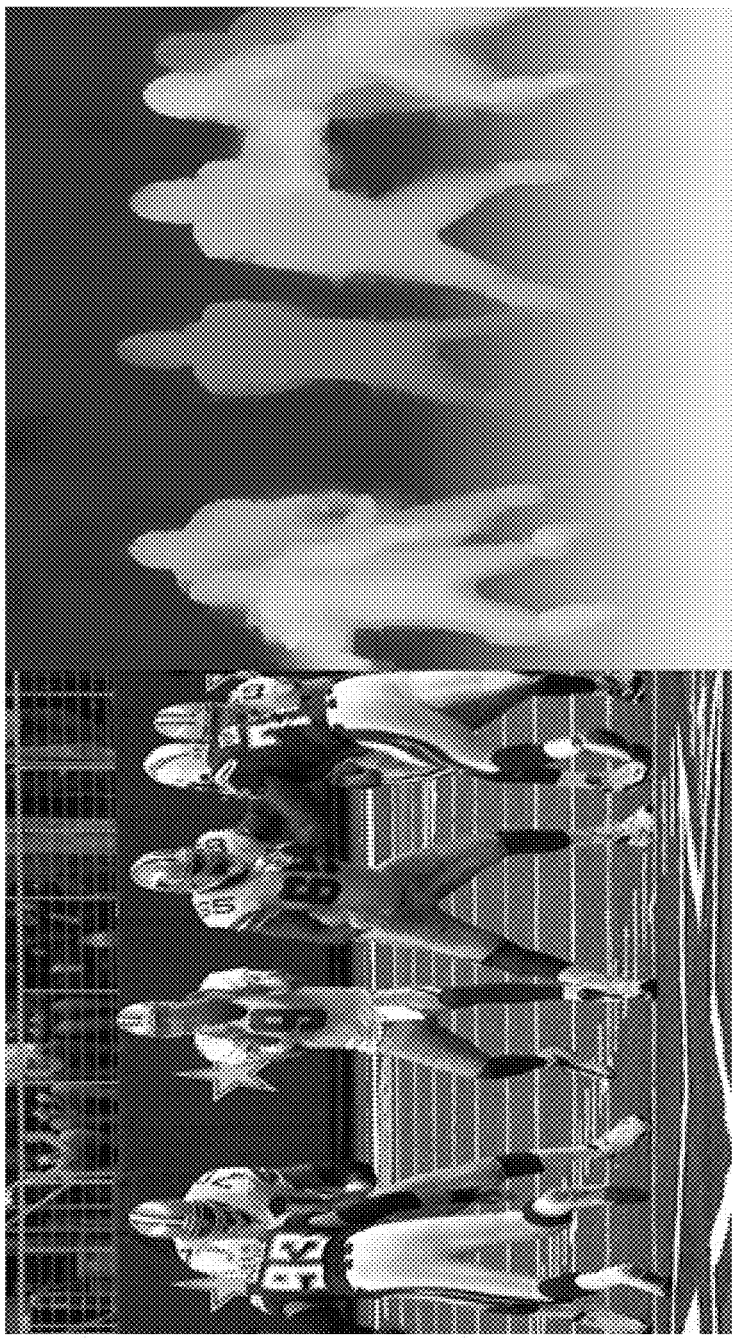
FIG. 16 is an image diagram showing a scene and a depth map for the scene according to an exemplary embodiment of the present inventive concept.

FIG. 16 shows a scene and a depth map for the scene according to an exemplary embodiment of the present inventive concept. A left picture of FIG. 16 shows a scene to be captured by the imaging device 200, and a right picture of FIG. 16 shows a depth map generated by the first CPU 315 or the second CPU 320. For example, when a scene is relatively close to the imaging device 200, a gray level may be expressed high (for example, bright), and when the scene is relatively far away from the imaging device 200, the gray level may be expressed low (for example, dark). That is, according to a distance between a scene and the imaging device 200, a gray level of a depth map may be expressed differently from each other.

Figure 17:
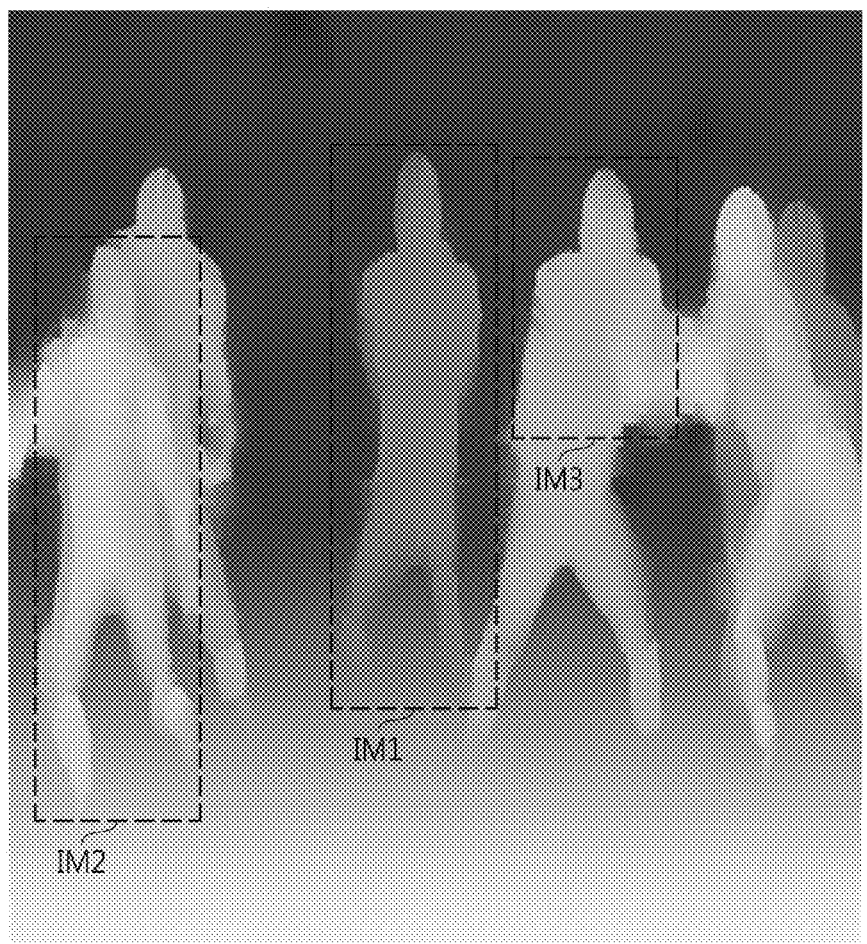
FIG. 17 is a conceptual diagram which describes autofocus on a region of interest (ROI) using the depth map according to an exemplary embodiment of the present inventive concept.

FIG. 17 is a conceptual diagram which describes an auto-focus on a region of interest (ROI) using the depth map according to an exemplary embodiment of the present inventive concept. Referring to FIGS. 16 and 17, a depth map is assumed to include three ROIs IM1, IM2, and IM3. It is assumed that an ROI (IM2) is the closest and an ROI (IM3) is the farthest.

When a user selects one of the ROIs IM1, IM2, and IM3, the first CPU 315 or the second CPU 320 may generate a control signal for an auto-focus for the ROI selected by the user, and transmit the control signal to an actuator 207 of the imaging device 200. The actuator 207 may control a movement of the lens 205 for auto-focus. For example, the actuator 207 may control the movement of the lens 205 so as to correctly adjust auto-focus on the selected ROI. Accordingly, the first CPU 315 or the second CPU 320 may recognize a gesture or a pose of a user included in the selected ROI.

An image signal processor for generating a depth map from phase detection pixels according to an exemplary embodiment of the present inventive concept may generate the depth map without using additional devices. The image signal processor for generating a depth map from the phase detection pixels according to an exemplary embodiment of the present inventive concept may produce a high quality image using low quality images.

The image signal processor according to an exemplary embodiment of the present inventive concept may correctly adjust auto-focus. That is, time for waiting a movement of an actuator for auto-focus is needed in an auto-focus camera system of the related art; however, an auto-focus camera system including the image signal processor according to an exemplary embodiment of the present inventive concept may automatically adjust focus on an object of selective interest using only a depth map.

An image signal processor for generating a depth map from phase detection pixels according to an exemplary embodiment of the present inventive concept can be used in an image processing system which can recognize a gesture or a pose of a user. The image signal processor for generating a depth map from phase detection pixels according to an exemplary embodiment of the present inventive concept may generate 3D contents.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image signal processor comprising:
a central processing unit (CPU) configured to receive image data and positional information of phase detection pixels from an imaging device, extract first phase detection pixel data and second phase detection pixel data from the image data using the positional information of the phase detection pixels, compute first phase graphs from the first phase detection pixel data based upon moving a first window, compute second phase graphs from the second phase detection pixel data based upon moving a second window, compute disparities between the first phase graphs and the second phase graphs, and generate a depth map based upon the disparities, wherein:
a size of the first window is set to be n*m pixels (the n, and m are the natural number more than 2),
using the first window present at a first position at a first time, each first axis value of each of the first phase graph for the first window is computed as a combination of values of each column of the first window or a combination of values of each row of the first window,
a size of the second window is set to be n*m pixels (the n, and m are the natural number more than 2),
using the second window present at the first position at the first time, each first axis value of each of the second phase graph for the second window is computed as a combination of values of each column of the second window or a combination of values of each row of the second window.

2. The image signal processor of claim 1, wherein the CPU is configured to convert the disparities into gray levels, and generate the depth map based upon the gray levels.

3. The image signal processor of claim 1, wherein the CPU is configured to set the first window and the second window having a same size as each other, and compute each of the first phase graphs and each of the second phase graphs based upon moving the first window and the second window in a scanning direction.

4. The image signal processor of claim 1, wherein each size of the first phase detection pixel data and the second phase detection pixel data is greater than a size of the depth map.

5. The image signal processor of claim 1, wherein the CPU is configured to generate three-dimensional image data using color data included in the image data and the depth map.

6. The image signal processor of claim 1, wherein the CPU is configured to recognize a gesture of a user corresponding to the image data using the depth map.

7. A mobile computing device comprising:
an imaging device including color pixels and phase detection pixels; and
an application processor including an image signal processor having a first CPU, the application processor including a second CPU, wherein:
at least one of the first CPU and the second CPU is configured to receive image data and positional information of the phase detection pixels from the imaging device, extract first phase detection pixel data and second phase detection pixel data from the image data using the positional information of phase detection pixels, compute first phase graphs from the first phase detection pixel data based upon moving a first window, compute second phase graphs from the second phase detection pixel data based upon moving a second window, compute disparities between the first phase graphs and the second phase graphs, and generate a depth map based upon the disparities,
a size of the first window is set to be n*m pixels (the n, and m are the natural number more than 2),
using the first window present at a first position at a first time, each first axis value of each of the first phase graph for the first window is computed as a combination of values of each column of the first window or a combination of values of each row of the first window,
a size of the second window is set to be n*m pixels (the n, and m are the natural number more than 2),
using the second window present at the first position at the first time, each first axis value of each of the second phase graph for the second window is computed as a combination of values of each column of the second window or a combination of values of each row of the second window.

8. The mobile computing device of claim 7, further comprising a memory configured to store the image data and the positional information of the phase detection pixels.

9. The mobile computing device of claim 7, wherein the at least one of the first CPU and the second CPU is configured to convert the disparities into gray levels, and generate the depth map based upon the gray levels.

10. The mobile computing device of claim 7, wherein the application processor further includes a graphics processing unit (GPU), and the at least one of the first CPU and the second CPU is configured to generate three-dimensional image data using color data included in the image data and the depth map, and the GPU is configured to render the three-dimensional image data.

11. The mobile computing device of claim 7, wherein the at least one of the first CPU and the second CPU is configured to determine a gesture of a user corresponding to the image data using the depth map.

12. The mobile computing device of claim 7, wherein the at least one of the first CPU and the second CPU is configured to generate a control signal for auto-focus on a region of interest (ROI) using the depth map, and transmit the control signal to the imaging device.

13. The mobile computing device of claim 7, wherein the at least one of the first CPU and the second CPU is configured to set the first window and the second window having a same size as each other, and generate each of the first phase graphs and each of the second phase graphs based upon moving the first window and the second window in a scanning direction at a same time.

14. The mobile computing device of claim 7, wherein each size of the first phase detection pixel data and the second phase detection pixel data is greater than a size of the depth map.

15. An image processing system comprising:
an imaging device including color pixels and phase detection pixels;
a memory configured to store image data and positional information of the phase detection pixels;
a controller including electronic circuitry configured to generate first phase detection pixel data and second phase detection pixel data from the image data using the positional information of the phase detection pixels, generate first phase representations from the first phase detection pixel data based upon moving a first window, generate second phase representations from the second phase detection pixel data based upon moving a second window, determine disparities between the first phase representations and the second phase representations, and generate a depth map based upon the disparities; and
a display configured to display images from the imaging device based upon the controller, wherein:
a size of the first window is set to be n*m pixels (the n, and m are the natural number more than 2),
using the first window present at a first position at a first time, each first axis value of each of the first phase representations for the first window is computed as a combination of values of each column of the first window or a combination of values of each row of the first window,
a size of the second window is set to be n*m pixels (the n, and m are the natural number more than 2),
using the second window present at the first position at the first time, each first axis value of each of the second phase representations for the second window is computed as a combination of values of each column of the second window or a combination of values of each row of the second window.

16. The image processing system of claim 15, wherein the electronic circuitry is configured to convert the disparities into gray levels, and generate the depth map based upon the gray levels.

17. The image processing system of claim 15, wherein the electronic circuitry is configured to set the first window and the second window having a same size as each other, and compute each of the first phase representations and each of the second phase representations based upon moving the first window and the second window in a scanning direction.

18. The image processing system of claim 15, wherein each size of the first phase detection pixel data and the second phase detection pixel data is greater than a size of the depth map.

19. The image processing system of claim 15, wherein the electronic circuitry is configured to generate three-dimensional image data using color data included in the image data and the depth map.

20. The image processing system of claim 15, wherein the electronic circuitry is configured to recognize a gesture of a user corresponding to the image data using the depth map.

* * * * *